US009454137B2

(12) United States Patent
Brainard et al.

(10) Patent No.: US 9,454,137 B2
(45) Date of Patent: Sep. 27, 2016

(54) SYSTEM AND METHOD OF LARGE AREA MICROGRID STABILITY CONTROLS

(71) Applicant: HONEYWELL INTERNATIONAL, INC., PATENT SERVICES M/S AB/2B, Morristown, NJ (US)

(72) Inventors: Gregory Brainard, Rio Rancho, NM (US); Scott Fischer, Rio Rancho, NM (US); Jeffrey M. Puffer, St. Petersburg, FL (US); Robert Harris, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 853 days.

(21) Appl. No.: 13/783,022

(22) Filed: Mar. 1, 2013

(65) Prior Publication Data

US 2014/0249686 A1 Sep. 4, 2014

(51) Int. Cl.
| | |
|---|---|
| *G05B 13/02* | (2006.01) |
| *H02J 3/08* | (2006.01) |
| *H02J 3/40* | (2006.01) |
| *H02J 3/00* | (2006.01) |

(52) U.S. Cl.
CPC .............. *G05B 13/02* (2013.01); *H02J 3/08* (2013.01); *H02J 3/40* (2013.01); *H02J 2003/001* (2013.01)

(58) Field of Classification Search
None
See application file for complete search history.

(56) References Cited

U.S. PATENT DOCUMENTS

| | | | | |
|---|---|---|---|---|
| 8,447,435 B1 * | 5/2013 | Miller | ...................... | G06F 1/263 700/286 |
| 8,781,640 B1 * | 7/2014 | Miller | ...................... | H02J 4/00 700/286 |

OTHER PUBLICATIONS

Kamel RM, Chaouachi A, Nagasaka K. "Analysis of transient dynamic response of two nearby microgrids under three different control strategies". Low Carbon Economy (2010) 1:39-53.*

* cited by examiner

*Primary Examiner* — Ryan Jarrett
(74) *Attorney, Agent, or Firm* — Shimokaji IP (57) ABSTRACT

A microgrid system may control power distribution among a plurality of interconnected microgrids operated under droop mode. The microgrids may operate both autonomously and as part of the system. Stable power distribution between the microgrids may be performed by monitoring operation of the microgrids and electrically disconnecting the microgrids from one another when a power outage or performance outside of a tolerance is detected. Network lines between the microgrids may remain in communication while the microgrids are disconnected from one another. The microgrids may operate autonomously under a preset operating droop frequency until power stability is detected at a boundary between adjacent microgrids. The microgrids may communicate with one another adjusting operating droop until synchronization among microgrids is achieved and the microgrids can be reconnected into the microgrid system.

8 Claims, 7 Drawing Sheets

SYSTEM AND METHOD OF LARGE AREA MICROGRID STABILITY CONTROLS

BACKGROUND OF THE INVENTION

The present invention generally relates to power distribution systems and more particularly to a system and method of large area microgrid stability controls.

Microgrid power installations are becoming more useful for power surety and security for bases, campuses, industrial facilities, and other collections of high priority electrical loads. These systems are a rapidly growing segment of the power industry. In general, microgrids may be used to manage sources, loads and storage systems to optimize availability, economy, reliability, etc. Sources can vary widely (e.g. utility grid, diesel generators, wind turbines, photovoltaics, gas turbines) and may deliver power as AC or DC. The loads the system supplies can also be AC or DC in nature, and may vary widely in their power requirements and over time. Current microgrids typically cover a small area with a small number of power generation sources or may depend on large central power plants that provide power to the loads in a similar manner that the electric utility company does.

In cases where many electric power generation sources such as backup generators and renewable sources are used, challenges occur with the coordination of the sources and with load management. For example, when a number of generators with controllers are networked and supply power to a common load circuit, changes in loads may cause instability on the grid. The response behavior of different sources to changes in loads may cause oscillations in generator loading that can result in "hunting" behavior and failure of the microgrid.

One approach to prevent instability uses several matched generators with similar behaviors to accommodate loads resulting from different buildings requiring power. However, some buildings may need much more power than others. Thus, to ensure an even distribution of power, some buildings may receive power from a generation source that is much larger and expensive than necessary.

As can be seen, there is a need for managing generators over large areas and which may use many disparate generation sources.

SUMMARY OF THE INVENTION

In one aspect of the present invention, a microgrid system, comprises a first microgrid including a first plurality of loads and a first plurality of power sources connected to the first plurality of loads; a first microgrid controller coupled to the first microgrid; a second microgrid connected to the first microgrid, the second microgrid including a second plurality of loads and a second plurality of power sources connected to the second plurality of loads; and a second microgrid controller coupled to the second microgrid, wherein the first microgrid controller and the second microgrid controller are configured to adjust an operating droop frequency of their respective first and second microgrids and control power flow between the first and second microgrids by the adjustment of the operating droop frequency.

In another aspect of the present invention, a microgrid controller, comprises a processor; and memory with instructions executed by the processor to: detect whether a utility signal from a utility source is available to a microgrid including the microgrid controller, control power distribution to a plurality of loads in the microgrid when the utility signal is available, disconnect the microgrid from other microgrids in a microgrid system when the utility signal is unavailable, and operate the microgrid autonomously from the other microgrids while disconnected.

In still another aspect of the present invention, a method of controlling a microgrid system comprises setting, by a processor, an operating droop frequency for a microgrid; determining whether a utility signal is available to the microgrid in the microgrid system; operating the microgrid under the set operating droop frequency when a utility signal is available; disconnecting the microgrid from other microgrids in the microgrid system when the utility signal is unavailable; shedding or adding loads in the microgrid until the operating droop frequency is achieved; operating the microgrid autonomously until power stability is detected at a boundary of the microgrid; and synchronizing the operation of the microgrid to the other microgrids.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a microgrid system connecting a plurality of autonomous microgrids and a method of regulating droop frequency among the microgrids while minimizing generator hunting. The microgrid system may be used for example, in large areas with multiple loads (for example, buildings drawing power). Military bases, campuses, and housing sub-divisions are examples of areas that may benefit from embodiments of the present invention.

Figure 1:
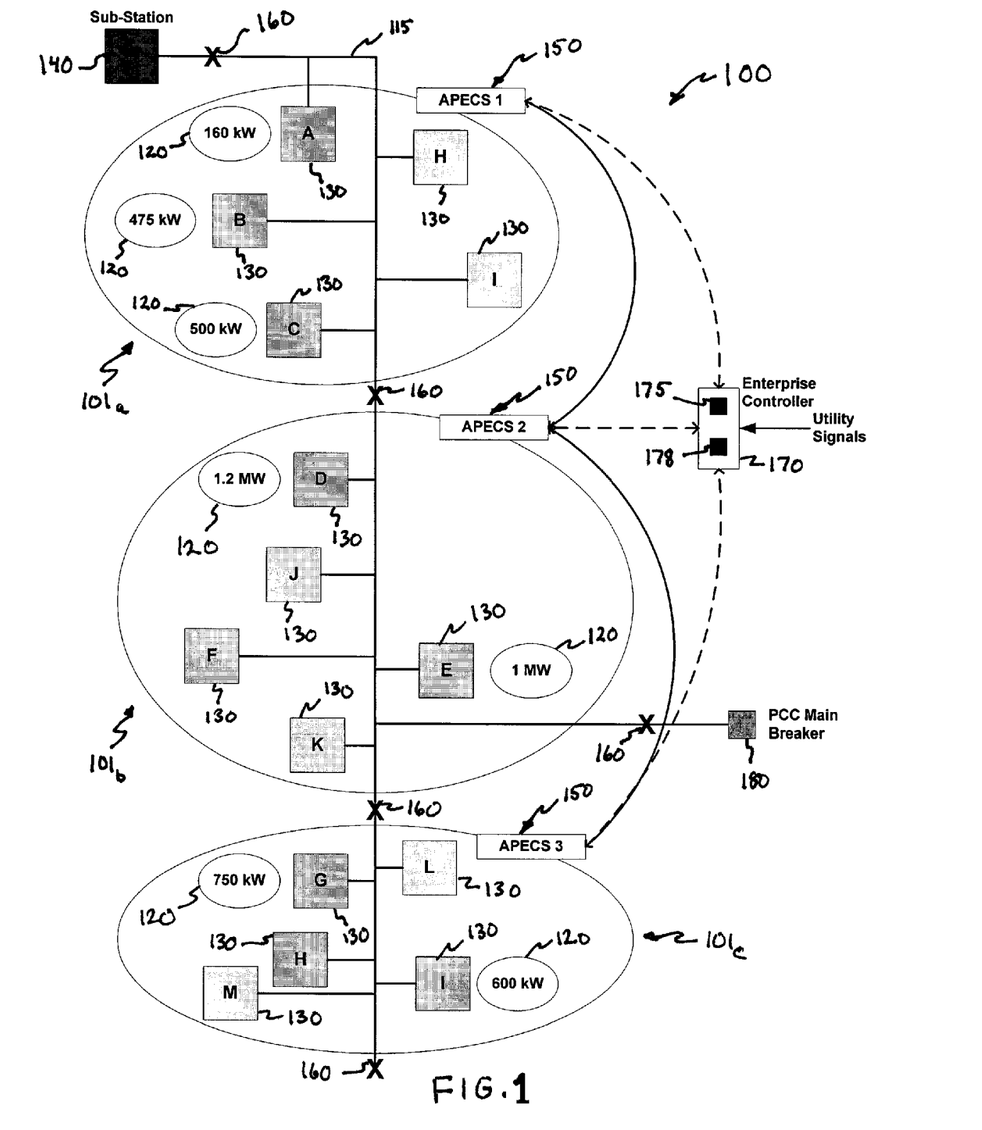
FIG. 1 is a schematic diagram of a microgrid system in accordance with an exemplary embodiment of the present invention.

Referring now to FIG. 1, a microgrid system 100 (also referred to as the system 100) is shown according to an exemplary embodiment of the present invention. The system 100 may include a plurality of interconnected microgrids 101a, 101b, and 101c (referred to in general as microgrid(s) 101). The microgrids 101 may operate both as autonomous localized sources of power generation and storage and as an interconnected group of microgrids distributing power to one another as demands on the system change. The system 100 may receive utility signals from a power plant (not shown) or from a sub-station 140. Power may be carried (from the power plant or substation 140) through the system 100 along a bus 115 (e.g. power lines, wiring, conduits, etc.). Boundaries of the microgrids 101 may be defined by the presence of a circuit breaker 160 on the bus 115. Details of the boundaries will be discussed in further detail below with respect to details of the microgrids 101. The circuit breakers 160 may also be present, for example, between the microgrid 101a and the substation 140 and between the microgrid 101b and a main breaker 180.

A system controller 170 may be connected to the microgrids 101. The system controller 170 may include a processor 175 and memory 178 in which instructions are stored that are executed by the processor 175. In some embodiments, the instructions may be stored on a non-transitory computer medium. The system controller 170 may receive utility signals from the power plant. The utility signals may indicate a higher demand for power on the system 100, a lower demand for power on the system 100. Communication between the system controller 170, the utility signal source(s), and the microgrids 101 may use any signal transmission or telephony means as is known in the art. However, in some embodiments, the system controller 170 may not necessarily have control over the individual elements of the microgrid 101. As may be appreciated, this may provide a safeguard against network hackers gaining control over power in the system 100.

A user may have access to the system controller 170 via an electronic interface (not shown) providing commands directing the system controller 170 to perform functions, via the processor 175, on the system 100. For example, the system controller 170 may monitor performance of the microgrids 101 and the system 100 and analyze the performance data for measurements which may indicate that a mode of operation should be initiated. Examples of different modes of operation for the system 100 will be described below with respect to a method of controlling the system 100 shown in FIG. 3.

Figure 1A:
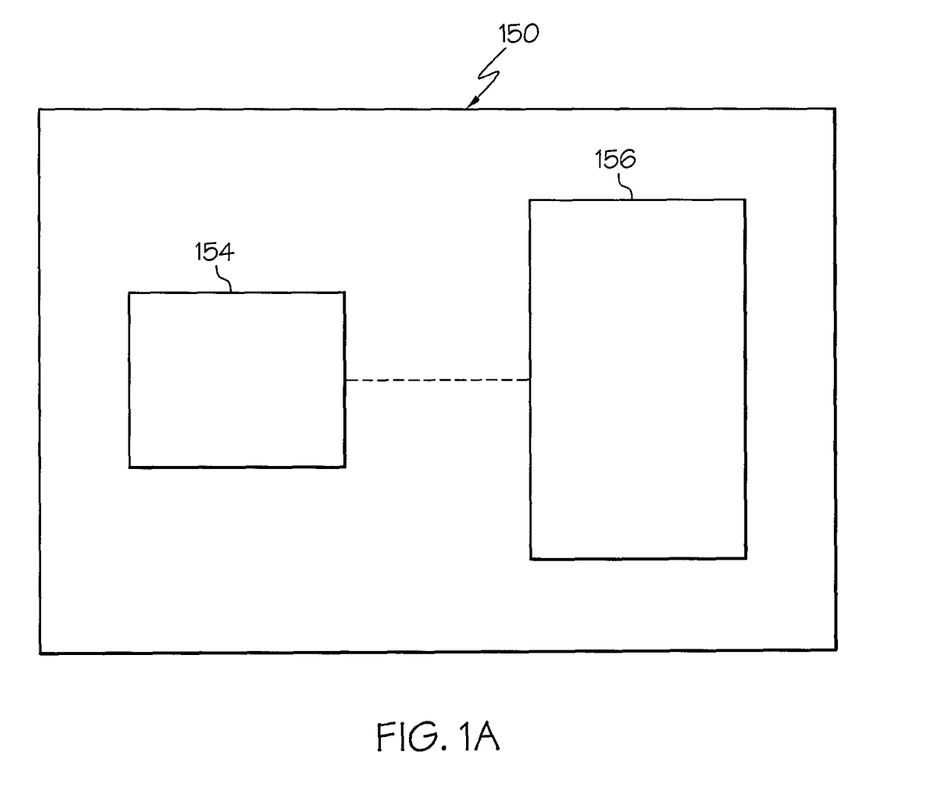
FIG. 1A is a block diagram of an exemplary controller system used in the microgrid system of FIG. 1.
Figure 2:
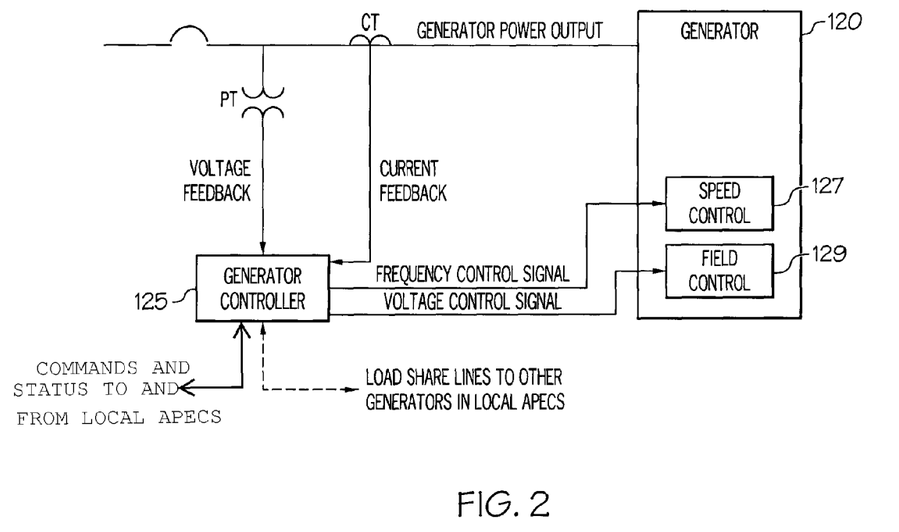
FIG. 2 is a diagram of an exemplary power source and controller connection scheme used in the microgrid system of FIG. 1.

Referring now to FIGS. 1, 1A, and 2, details of the microgrids 101 are shown according to an exemplary embodiment of the present invention. The microgrids 101 may include a plurality of power sources 120 and a plurality of loads 130 connected to the power sources 120. The power sources 120 may be for example, generators or inverters. For sake of illustration, microgrids 101a, 101b, and 101c are shown, however it will be understood that more microgrids 101 may be present in the system 100. In addition, while the microgrids 101 are shown as being connected linearly other arrangements may be used including ring and star type interconnections. Additionally, while the power sources 120 and loads 130 are shown in clustered groups of close proximity, it will be understood that FIG. 1 is only a schematic representation of the connections in the system 100 and the power sources 120 and the loads 130 may be physically disposed differently than shown. Additionally, more power sources 120 and loads 130 may be present than shown as the power sources 120 and loads 130 shown, in some embodiments, represent the extremities of the microgrids 101.

The boundary of a microgrid 101 may be defined by the loads 130 at the extremities of the bus 115 running through the microgrid 101. For example, the boundary of microgrid 101a may be defined by the load 130 "A" and the load 130 C" which bookend loads 130 "H", "B", and "I" along the bus 115. Additionally, the circuit breakers 160 may be positioned outside one of the loads 130 at the extremities. Thus, the boundary point between adjacent microgrids 101 may be defined by the presence of a circuit breaker 160 in between loads 130 at the extremities of adjacent microgrids 101. For example, the circuit breaker 160 between the load 130 labeled "C" and the load 130 labeled "D" may define a boundary point between microgrids 101a and 101b. The circuit breaker 160 between load 130 labeled "K" and load 130 labeled "L" may define a boundary point between microgrid 101b and microgrid 101c. The circuit breakers 160 may also define boundary points between a microgrid 101 and a utility device or a terminal end of the system 100. For example, the circuit breaker 160 between the substation 140 and the load 130 labeled "A" may define a boundary point between the microgrid 101a and the substation 140. The circuit breaker 160 between the load 130 labeled "E" and the main breaker 180 may define a boundary point between the microgrid 101b and the main breaker 180. The circuit breaker 160 connected to the load 130 labeled "M" may represent a boundary point between the microgrid 101c and a terminal point of the system 100.

In an exemplary embodiment, the microgrids 101 may include a microgrid controller 150. In some embodiments, the microgrid controller 150 may be called an Assured Power Enclave Control System (APECS). The microgrid controller 150 may include a processor 154 and memory 156 in which instructions are stored that are executed by the processor 154. In some embodiments, the instructions may be stored on a non-transitory computer medium. The microgrid controller 150 may control the microgrid 101 both as an autonomous microgrid 101 (disconnected from the remaining microgrids 101) and as a system microgrid 101 connected to one or more of the remaining microgrids 101. Details of the microgrid controller 150 control over the microgrid 101 during different operating modes will be described below.

The microgrid controller 150 may control functions within the microgrid 101. For example, the microgrid controller 150 may set the operating droop frequency for the microgrid 101. In setting and controlling the operating droop frequency, the microgrid controller 150 may control the power sources 120 to provide or decrease power to their respective loads 130. The microgrid controller 150 may control each of the power sources 120 through a local network line. Each power source 120 may include a controller 125 connected to the network line receiving commands from the microgrid controller 150. Loads may be shared among the power sources 120 through load share lines. Thus, control over the power sources 120 may be maintained locally within the microgrid 150. The controller 125 may adjust a speed control 127 and a field control 129 of the power source 120 to increase or decrease power to its load 130 based on commands received by the microgrid controller 150.

The microgrid controller 150 may designate one of the power sources 120 as a primary power source in setting the operating droop frequency for the microgrid 101. In some embodiments, this may be the power source 120 with the largest power rating in the microgrid 101. The microgrid controller 150 may control the remaining power sources 120 to provide power to their respective loads 130 in cooperation with the primary power source 120 so that the microgrid operating droop frequency is achieved within tolerance.

The microgrid controller 150 may also communicate with other microgrid controllers 150 in the system 100 sharing information and providing commands to control the distribution of power within the system 100. In an exemplary embodiment, high-speed secure network lines may connect the microgrid controllers 150 to one another providing inter-microgrid communication. For example, packet transfer may be exchanged at a rate of approximately 100 Mb/sec. The microgrid controllers 150 may exchange information including whether a utility signal is available from a utility source. The microgrid controllers 150 may pass frequency droop to actively manage load distribution between microgrids 101. In some embodiments, the controller 150 may coordinate load demand being shed or raised so that power output between adjacent microgrids 101 may be synchronized. The controller 150 may detect (via detectors providing feedback from the boundaries) that its microgrid 101 is producing insufficient power to meet its load requirements. In some embodiments, the processor 154 may issue a command to lower the operating frequency of the microgrid 101, thus causing power to be imported in from an adjacent microgrid 101 operating at a higher frequency. Conversely, the controller 150 may also raise the operating frequency when there is excess power available in the microgrid 101 thus exporting power to an adjacent microgrid 101. If communication lines between the microgrid controllers 150 fail, the microgrid controllers 150 may operate in a degraded mode where they may probe the boundaries (via the detectors) to determine whether power has returned. Thus, the microgrids 101 may still operate as a large area microgrid without a dedicated network. It may be appreciated that by separating the communication of monitored information at the system level from the inter-communication of the microgrid controllers 150 and from the intra-communication of the microgrid controller 150 to its corresponding power sources 120, cyber attacks attempting to control the power sources 120 may be prevented.

In an exemplary embodiment, the microgrid controllers 150 may operate their respective microgrids autonomously following an indication that a utility signal is unavailable or one of the microgrids 101 is operating out of tolerance. The microgrid controller 150 may control its microgrid 101 in general according to the above description, running a continuous loop waiting for an interrupt signal. On interrupt, the microgrid controller 150 may restart its power sources 120 to provide power to prioritized loads 130. The microgrid controller 150 may adjust the operating frequency to allow power to flow from any connected microgrid 101 until a stable power source is sensed by, for example, current and voltage transformers on the other side of the boundary of an adjacent microgrid 101. When a stable power source is identified or a certain maximum current flow is reached at the boundary, all loads can be re-energized.

In FIGS. 3-6 that follow, reference may be made to elements from FIGS. 1, 1A, and 2 above.

Figure 3:
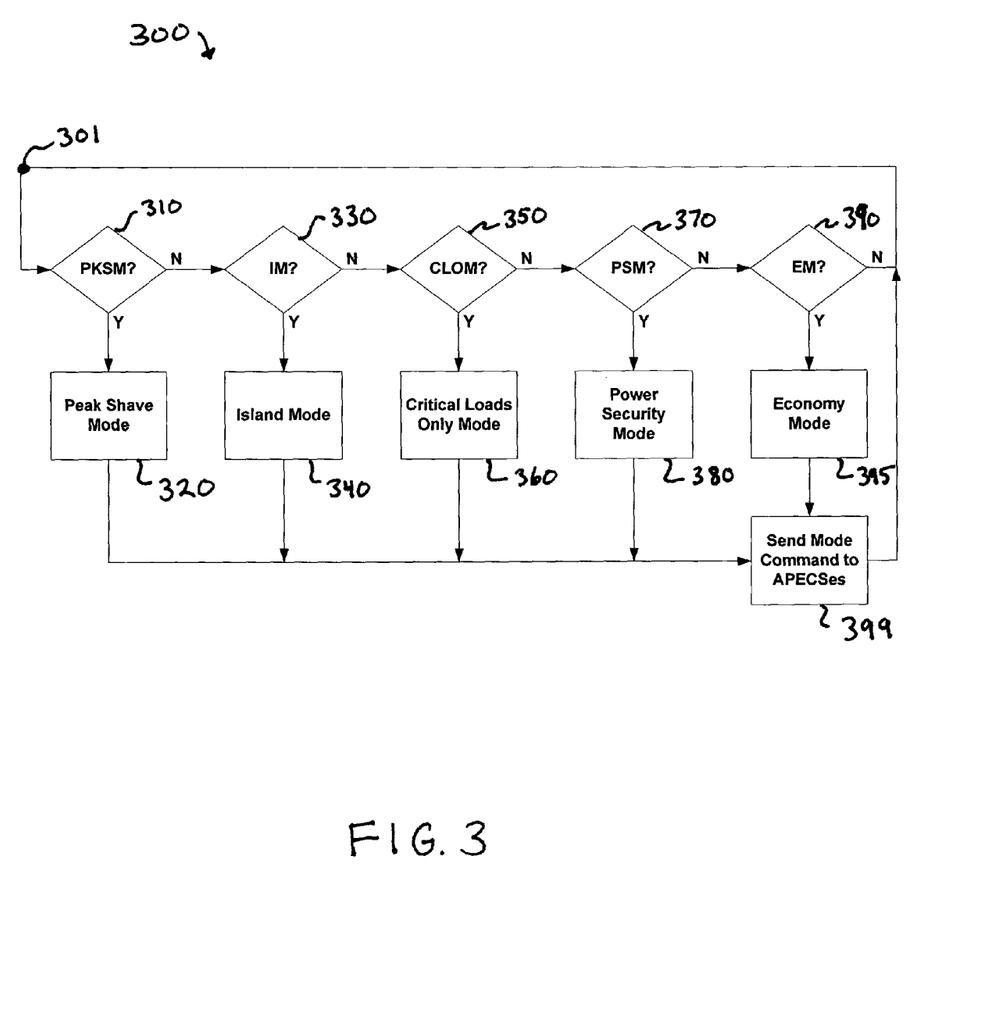
FIG. 3 is a block diagram illustrating a method of operating a microgrid system in accordance with another exemplary embodiment of the present invention.

Referring now to FIG. 3, a method 300 of controlling the microgrid system 100 is shown according to an exemplary embodiment of the present invention. The actions in the blocks may be stored as instructions within memory 178 and executed by the processor 175 in the system controller 170. In general, the system controller 170 may perform a series of checks for commands received by a user or from a utility source. Different commands may invoke an operation mode command transmitted to one or more of the microgrid controllers 150 according to the following. While the method 300 is shown in a continuous sequential loop, it will be understood that there is not necessarily a priority to the order of modes scanned. Additionally, the starting point 301 may be arbitrary and any of the mode checks may begin the loop.

The controller 170 may check (in block 310) whether a peak shave mode command is received. When a peak shave mode command is received, the controller 170 may send (in block 320) an indication to the microgrid controllers 150 to operate under peak shave mode. In peak shave mode, the user or the utility may indicate (in block 399) that power demand for the system 100 has increased. The microgrid controllers 150 may turn on or control power sources 120 to offset the rise in demand.

When a peak shave mode command is not received, the controller 170 may check (in block 330) for an island mode command. When an island mode command is received, the controller 170 may send (in block 340) an indication (in block 399) to the microgrid controllers 150 to operate under island mode. A command for island mode may be received, for example, when the system 100 is operating out of tolerance or when a power outage has occurred. In island mode, the microgrid controllers 150 may open the circuit breakers 160 at their respective microgrid 101 boundary points to disconnect their microgrid 101 from the other microgrids 101. The microgrid controllers 150 may reset and start the power sources 120 in their respective microgrids 101. The microgrids 101 may operate autonomously until adjacent microgrids 101 are operating stably and may be re-connected to share power until the system 100 is in a stable operating state. The autonomous operation of microgrids 101 and connection of adjacent microgrids is discussed in more detail below with respect to FIG. 4.

When an island mode command is not received, the controller 170 may check (in block 350) for a critical loads only command. When a critical loads only command is received, the controller 170 may send (in block 360) an indication (in block 399) to the microgrid controllers 150 to operate under critical loads only mode. The controller 170 may indicate to the microgrid controllers 150 that their respective microgrids 101 should maintain power to critical loads. In some embodiments, loads 130 may be prioritized according to critical functions. For example, in microgrid 101a, loads 130 labeled "A", "B", and "C" may be considered critical. Load 130 labeled, "H" may be considered as a secondary critical load. The load 130 labeled "I" may be a non-critical load. Thus, the microgrid controller 150 may shed power from loads "H" and "I" to ensure that loads "A", "B", and "C" receive their required power.

When a critical loads only command is not received, the controller 170 may check (in block 370) for a power security mode command. When a power security mode command is received, the controller 170 may send (in block 380) an indication (in block 399) to the microgrid controllers 150 to operate under power security mode. In some embodiments, the power security mode may be received, for example, during a power outage. The controller 170 may indicate to the microgrid controllers 150 that their respective microgrids 101 should invoke measures that control the power sources 120 to ensure that loads 120 have power for as long as possible during the outage.

When a power security mode command is not received, the controller 170 may check (in block 390) for an economy mode command. When an economy mode command is received, the controller 170 may send (in block 395) an indication (in block 399) to the microgrid controllers 150 to operate under economy mode. Under the economy mode, the controller 170 may indicate to the microgrid controllers 150 that their respective microgrids 101 should use power sources 120 sparingly to optimize cost savings of power usage.

Figure 4:
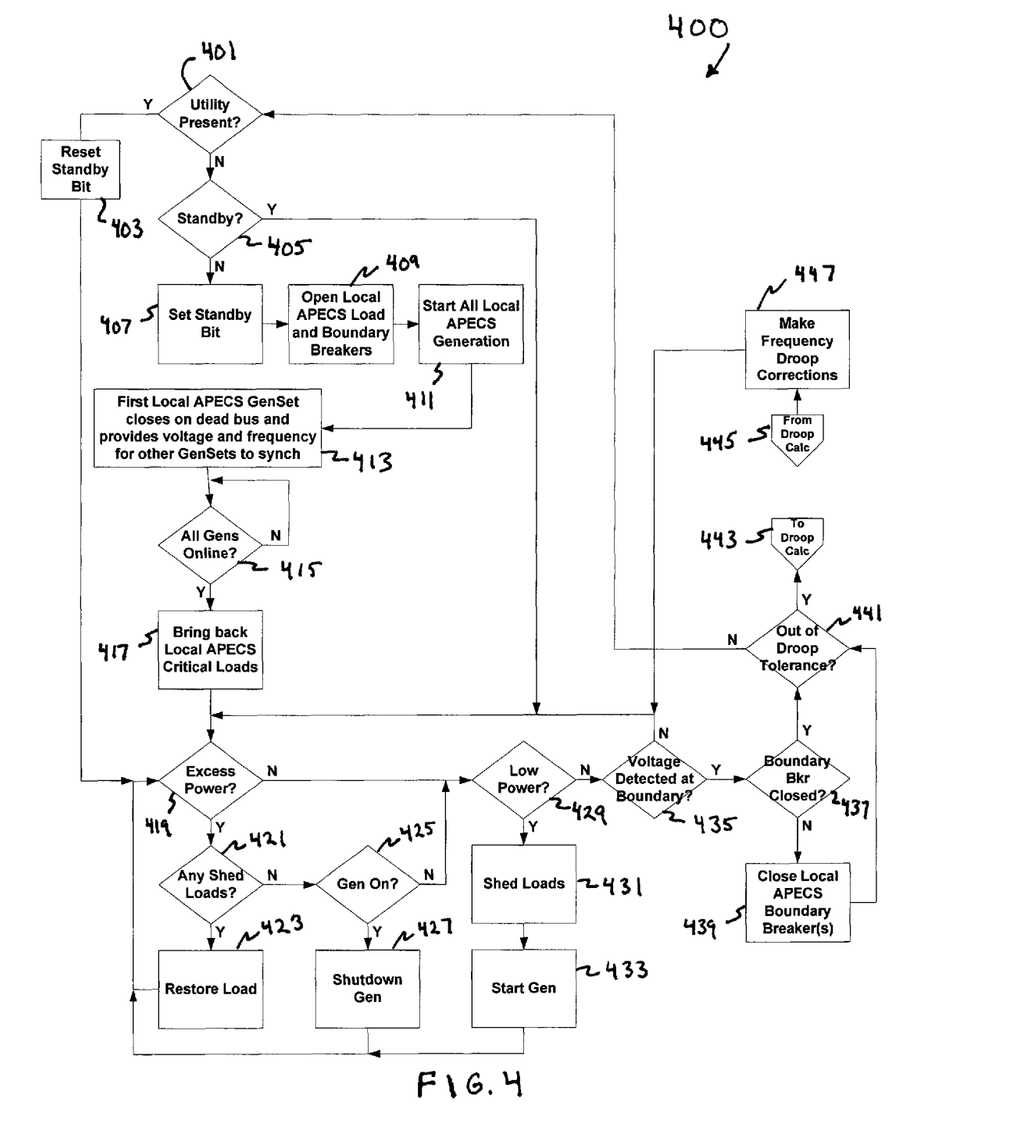
FIG. 4 is a block diagram illustrating a method of monitoring operation of a microgrid in accordance with another exemplary embodiment of the present invention.

Referring now to FIG. 4, a method 400 of monitoring a microgrid 101 is shown according to an exemplary embodiment of the present invention. The actions in the blocks may be stored as instructions within memory 156 and executed by the processor 154 in the microgrid controller 150.

The controller 150 may receive an indication from another microgrid controller 150 of whether a utility signal is present (in block 401). The presence of a utility signal may indicate that power is being supplied to the system 100 by the utility source. The absence of a utility signal may indicate that a power outage has occurred. If the utility signal is not present, the microgrid controller 150 may determine (in block 405) the state (e.g. "TRUE" or "FALSE") of a standby command bit. The state of the standby command bit may be stored and kept tracked in the memory 156. If the utility signal is present, then the microgrid controller 150 may reset (in block 403) the standby command bit (e.g. to "FALSE") and proceed to check (in block 419) for excess power in the microgrid 101.

If the controller 150 determines that the state of the standby command bit is currently "FALSE" after determining the utility signal is not present, then the microgrid controller 150 may set (in block 407) the standby command bit to a "TRUE" state. If the controller 150 determines that the state of the standby command bit is currently "TRUE" after determining the utility signal is not present, then the microgrid controller 150 may proceed to check (in block 419) for excess power in the microgrid 101. The controller 150 may open (in block 409) the circuit breakers 160 at the microgrid 101 boundaries thus isolating the microgrid 101 from other microgrids 101 in the system 100. The microgrid 101 may enter a localized operation starting (in block 411) the power sources 120 within its boundary. The controller 150 may synchronize (in block 413) the power sources 120 in the microgrid 101 to a first power source 120. The first power source 120 may provide the voltage and frequency for the other power sources 120 to operate under to establish the operating droop frequency for the microgrid 101. The controller 150 may bring online (in block 415) power sources 120 in the microgrid 101 until each power source 120 is on. The controller 150 may provide (in block 417) power to the loads 130. In an exemplary embodiment, the controller 150 may prioritize the order of loads 130 receiving power. For example, critical loads may receive power before other loads 130.

When loads 130 are receiving power, the controller 150 may determine (in block 419) whether excess power is present in the microgrid 101. When excess power is present, the controller 150 may determine (in block 421) if any unpowered or underpowered loads 130 are available to receive the excess power. If the loads 130 are available, the controller 150 may restore (in block 423) power the load(s) 130. If no loads are available to receive excess power, then the controller 150 may determine (in block 425) whether unnecessary power sources 120 are on. If unnecessary power sources 120 are on, the controller 150 may shut down (in block 427) any unnecessary power sources 120.

When the microgrid 101 does not have excess power or unnecessary power sources 120 are not on, the controller 150 may determine (in block 429) whether the microgrid 101 is operating underpowered. If the microgrid 101 is underpowered, the controller may shed (in block 431) loads 130 and may start (in block 433) any available power source 120 until the power level is sufficient. The method 400 may return to block 419 where a check for excess power is made.

When power is sufficient in the microgrid 101, the controller 150 may determine (in block 435) whether voltage is present at the microgrid boundary. When voltage is undetected, the method 400 may loop back to block 419 and check for excess power until voltage is detected. When voltage is detected at the boundary, the controller 150 may check (in block 437) if the circuit breaker 160 at the boundary is closed. When the circuit breaker 169 is open, the controller 150 may close the circuit breaker 160 before checking (in block 441) whether the voltage detected at the boundary indicates if the microgrid 101 is operating out of droop frequency tolerance. If the microgrid 101 is outside of the operating droop frequency tolerance, the controller 150 may calculate (in block 443) the droop correction for the microgrid 101. Details of the droop calculation are described in FIG. 6. From block 445, once droop correction is calculated, the controller 150 may correct the operating frequency of the microgrid 101 to within the droop tolerance.

Figure 5:
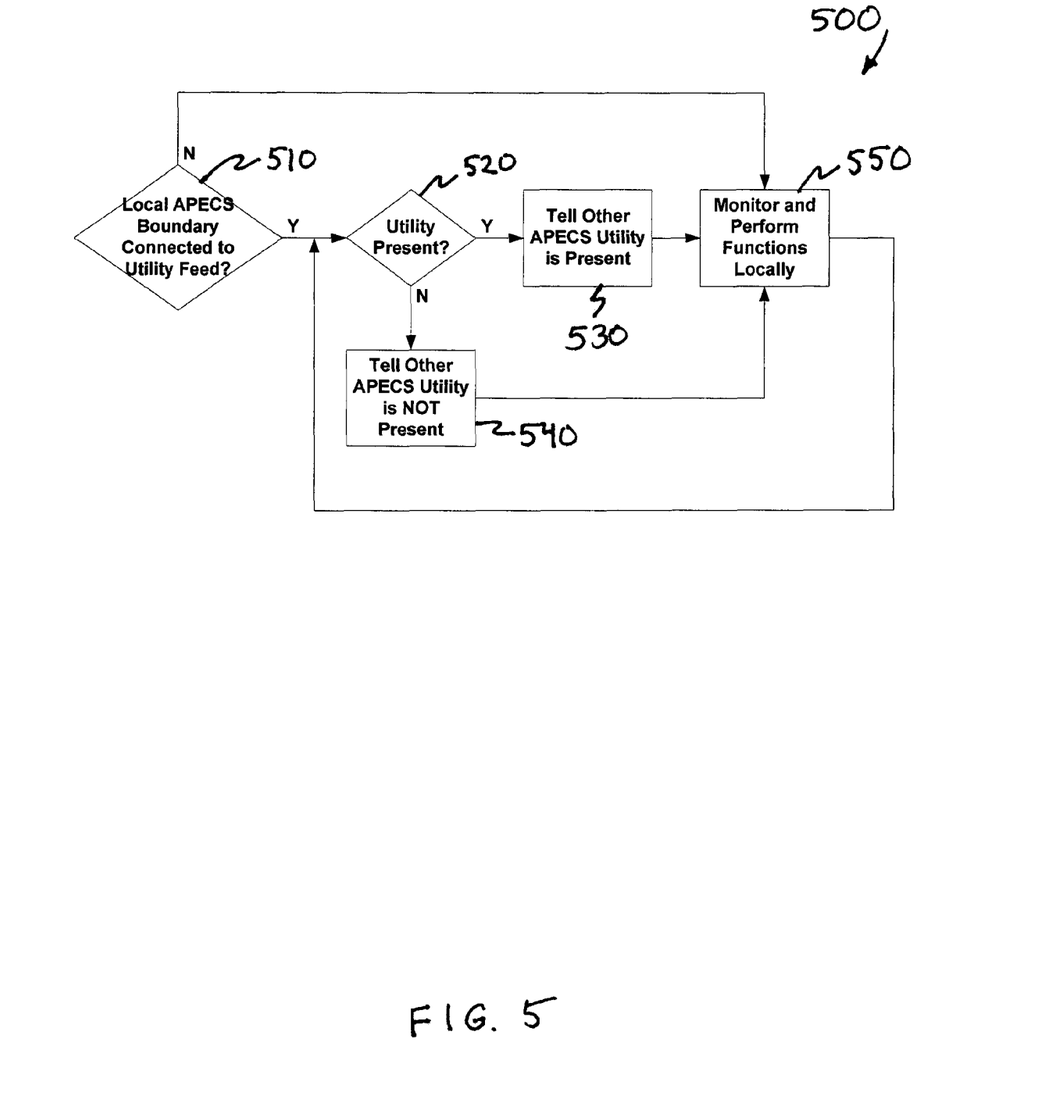
FIG. 5 is a block diagram illustrating a method of monitoring the presence of a utility signal in the microgrid system of FIG. 1 in accordance with yet another exemplary embodiment of the present invention.

Referring now to FIG. 5, a method 500 of monitoring a microgrid system for connection to a utility signal is shown according to an exemplary embodiment of the present invention. The actions in the blocks may be stored as instructions within memory 156 and executed by the processor 154 in the microgrid controller 150. In general, the method 500 may indicate to microgrid controllers 150 whether their microgrids 101 are drawing power from a utility source or should be producing power locally. The microgrid controller 150 may determine (in block 510) whether the microgrid 101 is connected to a utility signal feed at the microgrid boundary. For example, the microgrid controller 150 may check whether circuit breakers 160 are closed allowing the utility feed into the microgrid 101. When a connection is present, the microgrid controller 150 may determine (in block 520) if a utility signal is available. The presence of a utility may indicate that the utility source is operating and providing power to the microgrid system 100. When a utility signal is present, the microgrid controller 150 may provide (in block 530) an indication to other microgrid controllers 150 in the microgrid system 100 that a utility signal is available. The microgrid controller(s) 150 may perform (in block 550) control over local functions of the microgrid 101 using the utility signal. For example, power from the utility source may be monitored and distributed to the local loads 130 under the operating flow described in FIG. 4 (e.g. from blocks 419-447). When a utility signal is not available (as determined in block 540) or the microgrid 101 is not connected to a utility feed (as determined in block 410), the microgrid controller may provide (in block 540) an indication to other microgrid controllers 150 in the microgrid system 100 that a utility signal is unavailable signaling, for example, the occurrence of a power outage or the tripping of a circuit breaker 160. The microgrid controller(s) 150 may initiate (in block 550) local control of microgrid functions, for example, 130 under the operating flow described in FIG. 4 (e.g. from blocks 405-447).

Figure 6:
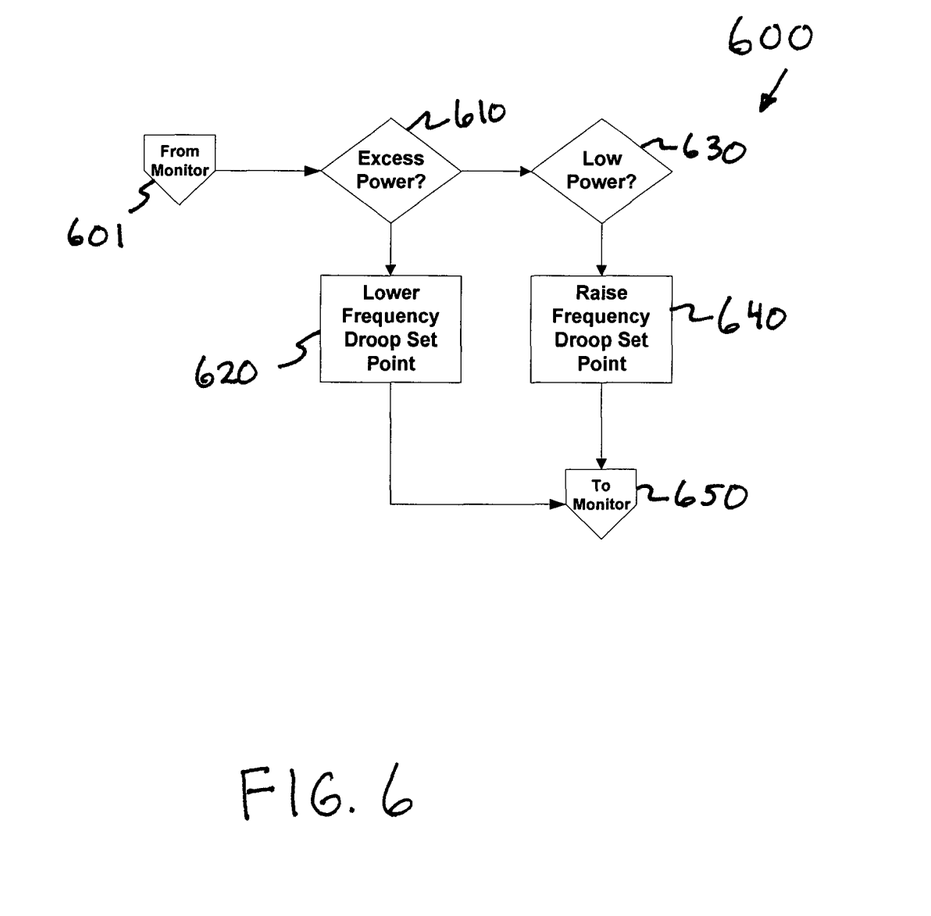
FIG. 6 is a block diagram illustrating a method of calculating a droop correction in accordance with yet another exemplary embodiment of the present invention.

Referring now to FIG. 6, a method 600 of adjusting the droop operating frequency for a microgrid 101 is shown according to an exemplary embodiment of the present invention. The actions in the blocks may be stored as instructions within memory 156 and executed by the processor 154 in the microgrid controller 150. In general, the microgrid controller 150 may adjust the operating droop frequency of a microgrid 101 to synchronize power flow with other microgrids 101. The microgrid controller 150 may receive (in block 601) voltage and frequency measurements at the microgrid 101 boundary. The microgrid controller 150 may determine (in block 610) whether excess power is available in the microgrid 101. When excess power is available, the microgrid controller 150 may lower (in block 620) the microgrid operating droop frequency. The excess power may then be drawn off by an adjacent microgrid 101 operating at a higher droop frequency. If excess power is unavailable, the microgrid controller 150 may determine (in block 630) whether insufficient power is available to the microgrid 101. If more power is required to power loads 130, the microgrid controller 150 may raise (in block 640) the microgrid operating droop frequency allowing power to flow in from other microgrids 101 until its loads 130 can be re-energized or a maximum current flow is reached at the boundary. The microgrid controller 150 monitor (in block 650) shedding or drawing of power until power flow between microgrids 101 is stabilized.

It should be understood, of course, that the foregoing relates to exemplary embodiments of the invention and that modifications may be made without departing from the spirit and scope of the invention as set forth in the following claims.

We claim:

1. A microgrid system, comprising:
    a first microgrid including a first plurality of loads and a first plurality of power sources connected to the first plurality of loads;
    a first microgrid controller coupled to the first microgrid;
    a second microgrid connected to the first microgrid, the second microgrid including a second plurality of loads and a second plurality of power sources connected to the second plurality of loads; and
    a second microgrid controller coupled to the second microgrid,
    wherein a first power source having the highest power rating from among the first plurality of power sources is designated as a primary power source to set operating droop frequency for the first microgrid, and
    wherein the first microgrid controller and the second microgrid controller are configured to adjust an operating droop frequency of their respective first and second microgrids and control power flow between the first and second microgrids by the adjustment of the operating droop frequency.

2. The microgrid system of claim 1, wherein the first microgrid controller is configured to raise the operating droop frequency of the first microgrid to draw more power into the first microgrid from the second microgrid.

3. The microgrid system of claim 1, wherein the first microgrid controller is configured to lower the operating droop frequency of the first microgrid to provide excess power into the second microgrid.

4. The microgrid system of claim 1, further comprising a circuit breaker disposed between a first load included in the first microgrid and a second load in the second microgrid.

5. The microgrid system of claim 4, wherein the first microgrid controller is configured to:
    determine that the circuit breaker is open; and
    control the first microgrid independent of the second microgrid while the circuit breaker is opened.

6. The microgrid system of claim 5, wherein the first microgrid controller is configured to restart the first plurality of power sources during independent control of the first microgrid and prioritize power distribution to the first plurality of loads.

7. The microgrid system of claim 5, wherein the first microgrid controller is configured to check for voltage at a boundary of the first microgrid and the second microgrid and determine whether the first microgrid is operating within an operating droop frequency tolerance.

8. The microgrid system of claim 1, wherein the first microgrid controller and the second microgrid controller may communicate with one another along a network line separate from a communication line from the first microgrid controller to the first plurality of power sources.

* * * * *